May 12, 1942.  S. R. PUFFER  2,282,825
VALVE SUPPORT
Filed Jan. 18, 1940
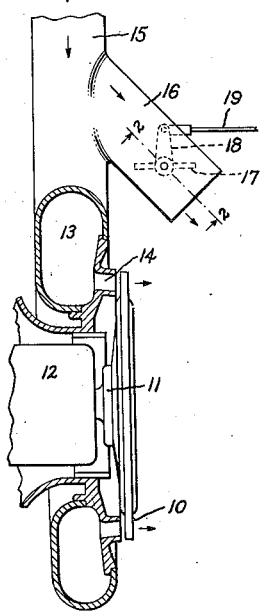
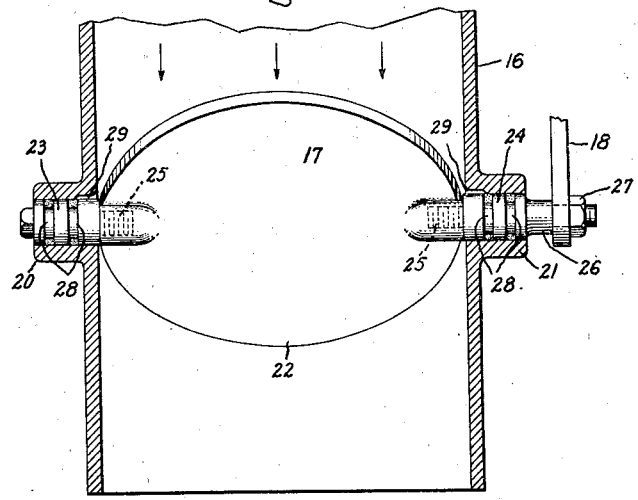
Inventor:
Samuel R. Puffer,
by Harry E. Dunham
His Attorney.

Patented May 12, 1942

2,282,825

UNITED STATES PATENT OFFICE 2,282,825

VALVE SUPPORT

Samuel R. Puffer, Lynnfield Center, Mass., assignor to General Electric Company, a corporation of New York Application January 18, 1940, Serial No. 314,495

4 Claims. (Cl. 308—121)

The present invention relates to valve supports, particularly to bearings for supporting waste gates or like movable elements controlling the flow of hot gases through a conduit, as are used, for example, in connection with exhaust gas-operated turbines. The temperature of such gases, which is often of the order of 700 degrees F. and above, causes considerable heating of the of the waste gate and its bearing support. These high temperatures, heretofore, have caused considerable wear of the bearings and have rendered it difficult effectively to lubricate them.

The object of my invention is to provide an improved construction and arrangement of bearings for supporting waste gates and like movable elements subject to high temperatures during operation.

For a consideration of what I believe to be novel and my invention, attention is directed to the following description and the claims appended thereto in connection with the accompanying drawing.

In the drawing Fig. 1 illustrates a gas turbine arrangement embodying my invention, and Fig. 2 is an enlarged detail view along line 2—2 of Fig. 1.

The arrangement comprises a gas turbine having a bucket wheel 10 secured to an overhung portion 11 of a shaft which in turn is supported on a bearing 12 and may serve to drive a supercharger, not shown. Operating gases are conducted and properly directed towards the buckets of the bucket wheel by means including a nozzle box 13 with a row of nozzles 14 adjacent the bucket wheel 10. Hot gases are conducted to the nozzle box 13 from a source of supply, such as the exhaust manifold of an internal combustion engine, not shown, by means of a conduit 15 connected to an opening of the box 13.

In order to control the flow of combustion gases from the conduit 15 to the box 13, the conduit is provided with a waste conduit 16 connected to an opening in the conduit 15 and provided with a waste gate valve 17. The latter has an arm 18 external to the conduit 16 and pivotally secured to a lever or operating rod 19. The positioning of the lever or rod 19 causes turning movement of the waste gate 17, thus increasing or decreasing the flow of gases through the waste conduit 16 and consequently decreasing or increasing respectively the flow of operating gas to the turbine. The support of the waste gate valve 17 forms an important feature of my invention, and as shown in Fig. 2, comprises two sleeve or journal bearings 20 and 21 secured to diametrically opposite openings of the waste conduit 16. The waste gate valve in the present example is in the form of a disc 22. Trunnions of shaft members 23 and 24 are rotatably supported on the bearings 20 and 21 respectively and fastened to the disc 22. In the present instance, each trunnion has a threaded portion 25 screwed into a reinforced rim portion of the disc 22. The trunnion 24 has an extension 26 to which the arm 18 is fastened by a nut 27.

In order to reduce the wear of the adjacent surfaces of the trunnion members and the bearing members, grooves are formed in one of these members initially to receive lubricant in the form of a paste of a mixture of graphite and water. In the present example, each trunnion has two spaced annular grooves 28. These grooves are filled with lubricant consisting substantially of graphite prior to their assembly in the bearings. This initial lubrication serves primarily to prevent wear during the starting period of the plant. Subsequent lubrication is furnished by the carbon content of the gas flowing through the waste conduit. Carbon particles contained in these gases pass into the bearings and there act to lubricate them.

In order to facilitate the entry of such carbon particles into the bearings, I provide each of the bearing or trunnion members with a groove or recess. In the arrangement shown, each bearing has an axial groove 29 located and arranged to receive carbon particles contained in the gases flowing through the conduit and to conduct such particles towards one of the grooves 28.

What I claim as new and desire to secure by Letters Patent of the United States, is:

1. The combination with a conduit for conducting combustion gases containing unburned carbon and a movable element disposed within the conduit for controlling the flow of gases therethrough, of means for supporting the element, said means including trunnions secured to diametrically opposite portions of the element and journal bearings fastened to the conduit with bearing surfaces engaging the trunnions, each trunnion having a plurality of spaced annular grooves initially filled with luricant consisting substantially of graphite for lubricating the bearings during the starting period, and each bearing having a groove in its surface communicating with the interior of the conduit and arranged to receive carbon particles from the gases flowing through the conduit to lubricate the bearings during normal operation.

2. The combination with a casing for gas containing unburned carbon and a movable element in the casing, of means supporting the element comprising a bearing member on the casing, a shaft member secured to the element and supported on the bearing member, one of the members having an annular groove for initially receiving a graphite containing lubricating paste and one of the members having an axial groove to establish communication between the annular groove and the interior of the casing for conducting gas containing carbon to the annular groove to effect lubrication during operation.

3. A bearing arrangement comprising a bearing member and a shaft member supported on the bearing member, one of the members having a plurality of spaced annular grooves for initially receiving graphite containing lubricating paste, and means for conducting gas containing carbon to the grooves including an axial groove formed in one of the members and extending to one end of such member.

4. The combination with a casing for gas containing unburned carbon and a movable element in the casing, of means for supporting the element comprising a bearing member on the casing, a shaft member secured to the element and supported on the bearing member, one of the members having a groove for initially receiving a graphite containing lubricating substance, and means establishing communication between said groove and the interior of the casing for conducting gas containing carbon to the groove to effect lubrication during operation.

SAMUEL R. PUFFER.